(12) United States Patent
Field, Jr.

(10) Patent No.: US 9,718,411 B2
(45) Date of Patent: Aug. 1, 2017

(54) TAILGATING TRAILER HITCH ASSEMBLY

(71) Applicant: Richard Doak Field, Jr., Boerne, TX (US)

(72) Inventor: Richard Doak Field, Jr., Boerne, TX (US)

( * ) Notice: Subject to any disclaimer, the term of this patent is extended or adjusted under 35 U.S.C. 154(b) by 0 days.

(21) Appl. No.: 15/164,706

(22) Filed: May 25, 2016

(65) Prior Publication Data

US 2016/0368427 A1 Dec. 22, 2016

Related U.S. Application Data

(60) Provisional application No. 62/180,893, filed on Jun. 17, 2015.

(51) Int. Cl.
| | | |
|---|---|---|
| *B60R 11/00* | (2006.01) | |
| *B60R 9/06* | (2006.01) | |
| *B60R 3/00* | (2006.01) | |
| *B60D 1/58* | (2006.01) | |
| *B60D 1/00* | (2006.01) | |

(52) U.S. Cl.
CPC .................. *B60R 9/06* (2013.01); *B60D 1/58* (2013.01); *B60R 3/007* (2013.01); *B60R 9/065* (2013.01); *B60D 1/00* (2013.01); *B60R 2011/0078* (2013.01)

(58) Field of Classification Search
CPC ... B60R 9/06; B60R 11/00; B60R 2011/0078; B60R 2011/0082; B60R 3/007; B60R 9/065; B60D 1/00
USPC ................................. 224/519, 521, 524, 527
See application file for complete search history.

(56) References Cited

U.S. PATENT DOCUMENTS

| | | | | | |
|---|---|---|---|---|---|
| 4,277,008 | A | * | 7/1981 | McCleary | B62K 27/12 224/401 |
| 4,887,526 | A | * | 12/1989 | Blatt | B60R 5/04 108/44 |
| 5,029,740 | A | * | 7/1991 | Cox | B61D 47/00 190/15.1 |
| 5,106,002 | A | * | 4/1992 | Smith | B60R 9/065 224/506 |
| 5,203,266 | A | * | 4/1993 | Stevens | A47B 3/00 108/115 |
| D389,452 | S | * | 1/1998 | Scott | D12/415 |
| 5,752,639 | A | * | 5/1998 | Rice | B60R 9/10 224/510 |
| 6,260,752 | B1 | * | 7/2001 | Dollesin | B60R 9/065 224/495 |

(Continued)

*Primary Examiner* — Brian D Nash
(74) *Attorney, Agent, or Firm* — Plager Schack LLP

(57) ABSTRACT

Some embodiments of the present disclosure include a tailgating assembly configured to attach to a receiving hitch on a vehicle. The assembly may include a cargo basket with a lid, the cargo basket configured to attach to a hitch on a vehicle; a mast removably attached to the cargo basket, the mast extending upward from the cargo basket; a table removably attached to the mast; optionally a wine rack, TV mount and sign assembly also removably attached to the mast; and a side table optionally removably attached to the cargo basket. The lid may be configured to be positioned in two configurations: first as a cover to close the cargo basket, and second as an additional table attached to an end of the cargo basket. The tailgating assembly may be sized to break down and fit within the cargo basket when not in use.

11 Claims, 5 Drawing Sheets

(56) References Cited

U.S. PATENT DOCUMENTS

| | | | | |
|---|---|---|---|---|
| 6,314,891 B1* | 11/2001 | Larson | A47B 3/14 | 108/44 |
| 6,336,413 B1* | 1/2002 | Ball | B60R 9/06 | 108/44 |
| 6,467,417 B1* | 10/2002 | Guyot | B60P 3/14 | 100/152 |
| 6,662,983 B2* | 12/2003 | Lane | B60R 9/06 | 108/44 |
| 6,725,855 B1* | 4/2004 | Brennan | A47J 37/0763 | 126/276 |
| 6,739,269 B1* | 5/2004 | Benton | A47B 31/06 | 108/152 |
| 6,739,643 B1* | 5/2004 | Rock | B60N 2/3011 | 296/64 |
| 7,004,365 B2* | 2/2006 | Ingram | B60R 7/14 | 220/23.91 |
| 7,156,273 B2* | 1/2007 | Morris | B60R 9/06 | 108/14 |
| 7,281,646 B2* | 10/2007 | Flannery | B60R 9/06 | 126/276 |
| 7,591,404 B2* | 9/2009 | LeDuc | F24C 15/30 | 126/276 |
| 8,061,571 B2* | 11/2011 | Aghajanian | B60R 9/06 | 224/499 |
| 8,065,996 B1* | 11/2011 | Neuvelt | A47J 37/0704 | 126/24 |
| 8,231,036 B2* | 7/2012 | Campbell | B60R 9/065 | 224/42.32 |
| 8,292,073 B2* | 10/2012 | Thomas | A47F 7/0021 | 206/315.1 |
| 8,474,561 B2* | 7/2013 | Allingham | B60R 9/06 | 180/89.11 |
| 8,556,145 B1* | 10/2013 | Ezra | B60R 9/045 | 224/498 |
| 8,590,853 B2* | 11/2013 | Greenwood | B66F 1/06 | 248/352 |
| 8,616,630 B1* | 12/2013 | Midkiff | A47B 83/02 | 108/44 |
| 8,631,982 B2* | 1/2014 | Vicente | B60D 1/58 | 109/51 |
| 8,672,200 B2* | 3/2014 | O'Hare | B60R 9/06 | 224/519 |
| 8,820,598 B2* | 9/2014 | Tennyson | B60R 9/065 | 224/509 |
| 8,857,688 B1* | 10/2014 | Bell, III | B60R 9/06 | 224/497 |
| 2005/0092800 A1* | 5/2005 | Wilson | B60R 9/08 | 224/513 |
| 2009/0140024 A1* | 6/2009 | McLemore | B60R 9/06 | 224/519 |
| 2010/0147918 A1* | 6/2010 | Hensley | B62J 9/001 | 224/600 |
| 2010/0176170 A1* | 7/2010 | O'Hare | B60R 9/06 | 224/519 |
| 2010/0224663 A1* | 9/2010 | Butler, III | B60R 9/06 | 224/498 |
| 2015/0175085 A1* | 6/2015 | Raley | B60R 9/065 | 224/519 |

* cited by examiner

TAILGATING TRAILER HITCH ASSEMBLY

RELATED APPLICATION

This application claims priority to provisional patent application U.S. Ser. No. 62/180,893 filed on Jun. 17, 2015, the entire contents of which is herein incorporated by reference.

BACKGROUND

The embodiments herein relate generally to tailgating, and more particularly, to a tailgating trailer hitch assembly.

Tailgaters are space constrained in parking lots of sports venues and other locations. Conventional tailgating setups often require at least two parking spaces, take a long time to set up, and are difficult to transport.

Therefore, what is needed is a tailgating assembly that is easy to setup and breakdown, is self-contained for transport, and expands vertically rather than horizontally, to take up minimal space.

SUMMARY

Some embodiments of the present disclosure include a tailgating assembly configured to attach to a receiving hitch on a vehicle. The assembly may include a cargo basket with a lid, the cargo basket configured to attach to a hitch on a vehicle; a mast removably attached to the cargo basket, the mast extending upward from the cargo basket; a table removably attached to the mast; optionally a wine rack, TV mount and sign assembly also removably attached to the mast; and a side table optionally removably attached to the cargo basket. The lid may be configured to be positioned in two configurations: first as a cover to close the cargo basket, and second as an additional table attached to an end of the cargo basket. The tailgating assembly may be sized to break down and fit within the cargo basket when not in use.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
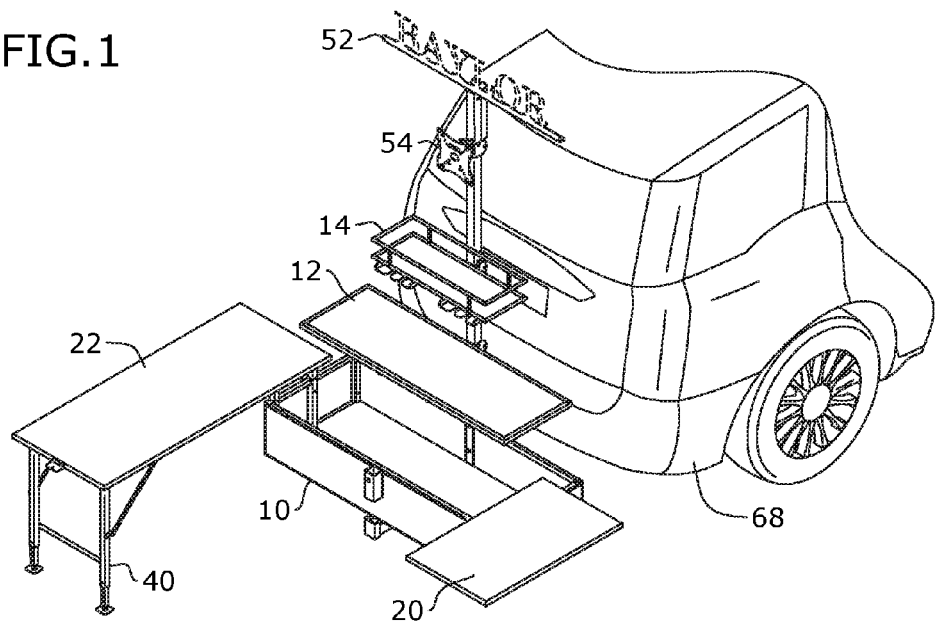
FIG. 1 is a perspective view of one embodiment of the present disclosure.
Figure 2:
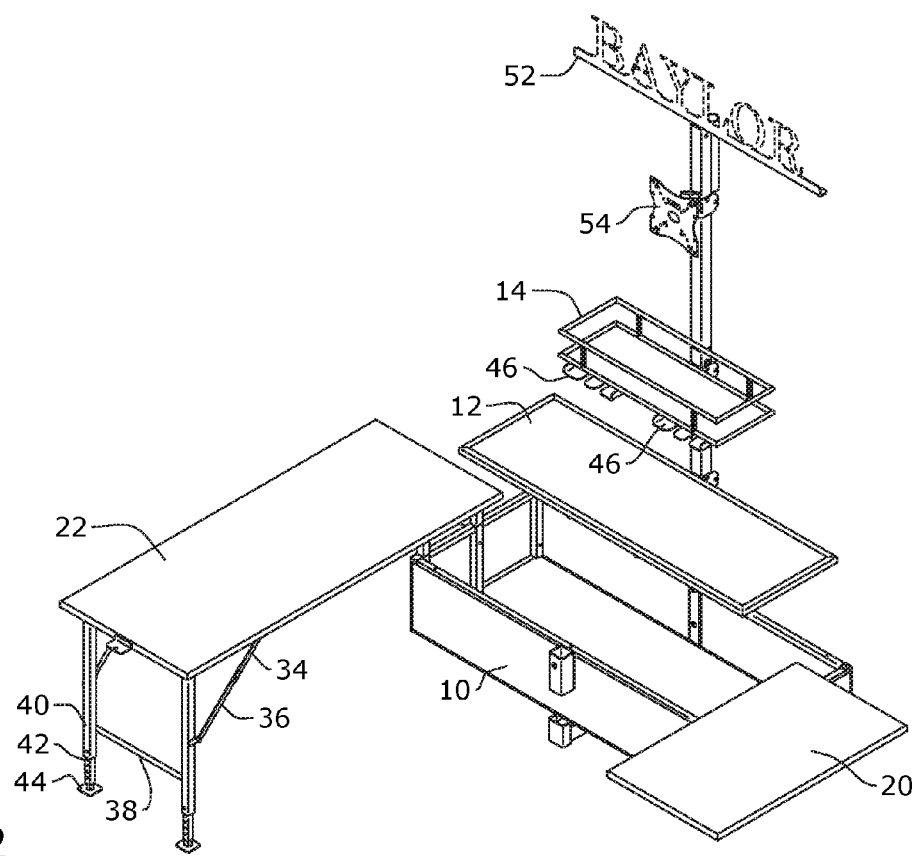
FIG. 2 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a tailgating assembly and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Cargo Basket
2. Table(s)
3. Lid
4. Trailer Hitch

The various elements of the device of the present disclosure may be related in the following exemplary fashion. It is not intended to limit the scope or nature of the relationships between the various elements and the following examples are presented as illustrative examples only.

By way of example, and referring to FIGS. 1-9, some embodiments of the present disclosure include a tailgating assembly configured to attach to the receiving hitch 64 on a vehicle 68, the tailgating assembly comprising a cargo basket 10 with a lid 22, the cargo basket 10 having a cargo hitch attachment 56 attached thereto; a hitch 58 extending from the cargo hitch attachment 56, the hitch 58 configured to engage with the receiving hitch 64; a mast removably attached to the cargo basket 10, the mast extending upward from the cargo basket 10; a table 12 removably attached to the mast; optionally, a wine rack 46 removably attached to the mast vertically above the table 12, the wine rack 46 optionally including glass holders 46 on a bottom surface thereof; optionally, a TV mount 54 attached to the mast vertically above the wine rack 46; optionally, a sign assembly 52 extending from a top surface of the mast; and optionally, a side table 20 attached to the cargo basket 10, wherein the lid 22 may be removed and reattached to the cargo basket 10 in a different configuration to function as an additional table, the lid 22 having a foldable leg assembly 40 attached thereto, and wherein the entire assembly may collapse down into the cargo basket 10 with the lid 22 functioning to enclose the components of the assembly within the cargo basket 10. As shown in the Figures, the assembly may be set up such that a side table 20 is attached to a first end of the cargo basket 10 via a pair of removable legs; the lid 22 may be attached to an opposite end of the cargo basket 10 from the side table 20 via a pair of removable legs, the leg assembly 40 folded down to hold the lid 22 up like a table; the mast may extend upwards from a surface of the cargo basket 10 proximate the hitch 58; a table 12 may be attached to a first position on the mast; a wine rack 14 may be attached to a second position on the mast, the wine rack 14 comprising a surface with a railing to prevent bottles or other items from slipping off of the surface; a TV mount 54 may be attached to a third position on the mast; and the sign assembly 52, such as a college name or team logo, may be attached to the top of the mast.

As shown in the figures, the legs used to attach the side table 20 and the lid 22 to the ends of the cargo basket 10 may each comprise an upper leg 16 and a lower leg 18, wherein the lower leg 18 is attached to the cargo basket 10 and the upper leg 16 is removably attached to the lower leg 18, resulting in the side table 20 and the lid 22 being positioned vertically above the cargo basket 10 when set up as tables. As shown in the Figures, the leg assembly 40 attached to the lid 22 may comprise an extendable leg 42 attached to an extendable foot 44, such that the height of an end of the lid 22 not attached to the cargo basket 10 may be adjusted, as needed, to create a level surface. The extendable leg 42 may fold up against a bottom surface of the lid 22 for storage. Thus, the extendable leg 42 may be attached to the bottom surface of the lid 22 via folding hinges 34, 36, wherein folding hinge 34 may attach to the lid 22 at folding mount 32 and folding hinge 36 may attach to the extendable leg 42 at hinge mount 30. In embodiments, the leg assembly 40 comprises a pair of extendable legs 42, each extendable leg 42 being attached to the lid 22 proximate to a corner of the lid 22 via a hinge 28, wherein a stabilizer 38 attaches the extendable legs 42 to each other.

Figure 3:
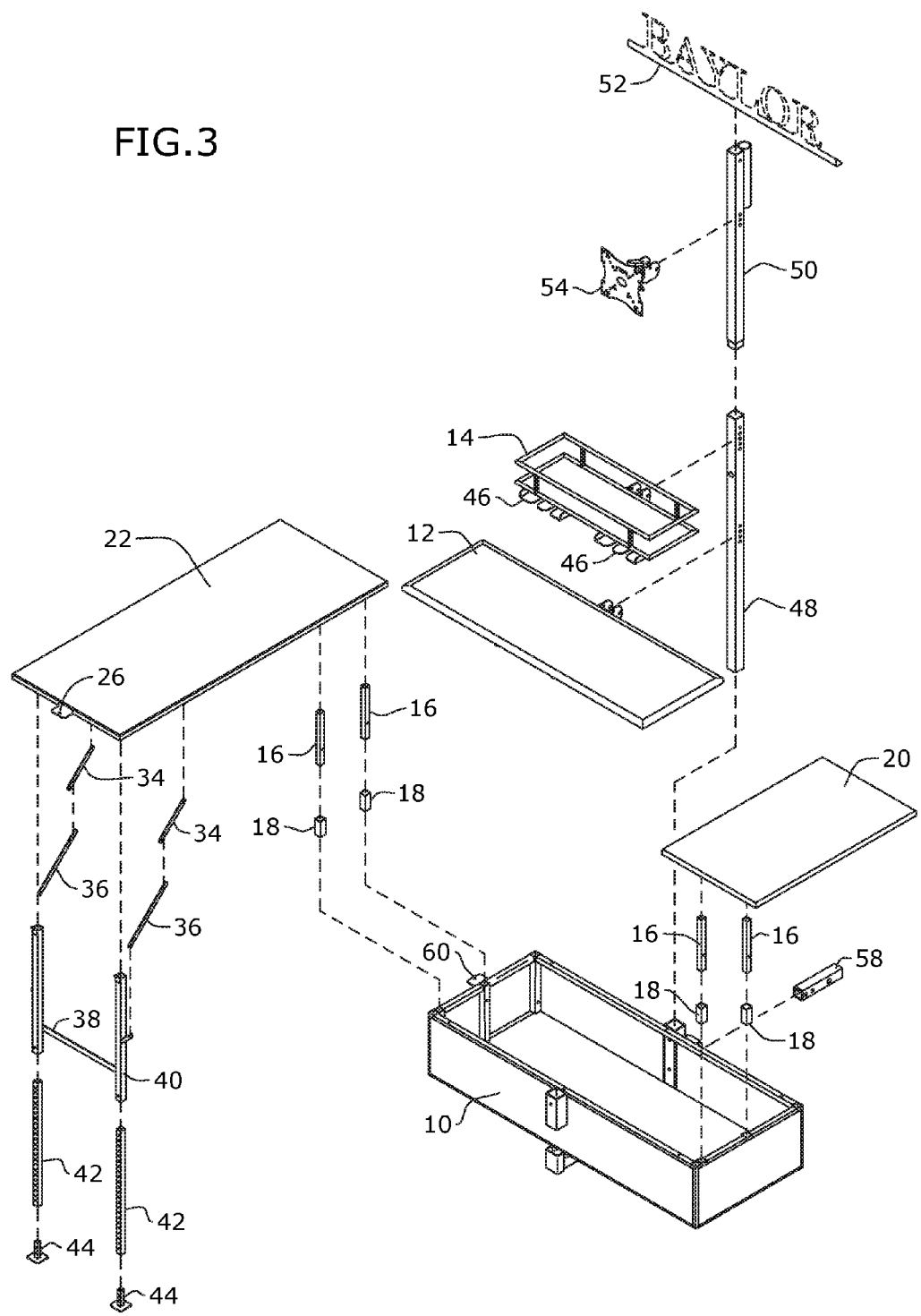
FIG. 3 is an exploded view of one embodiment of the present disclosure.

An end of the cargo basket 10 may comprise a cargo latch 60, and an end of the lid 22 may comprise a latch 26, as shown in FIG. 3. When the lid 22 is placed on the cargo basket 10 as a cover, the cargo latch 60 and the latch 26 may be aligned. Each of the latches 26, 60 may comprise an orifice through which a lock may pass such that the tailgating assembly may be locked within the cargo basket 10 during transport or while not in use. The cargo basket 10 may also comprise at least one cargo catch slot 62 on an end of the cargo basket 10 opposite the cargo latch 60, and the lid 22 may comprise at least one lid catch 24 on an end of the lid 22 opposite the latch 26, the lid catch 24 configured to engage with the cargo catch slot 62 to secure the lid 22 in a closed configuration on the cargo basket 10.

As shown in FIG. 3, the mast may comprise a lower mast assembly 48 and an upper mast assembly 50, such that the mast may be broken down to fit within the cargo basket 10 when not in use. The table 12 and the wine rack 14 may, in some embodiments, be adjustably attached to the lower mast assembly, while the TV mount 54, which may be a conventional universal TV mount, may be adjustably attached to the upper mast assembly 50. Each of the components configured to attach to the mast may comprise a pair of mounts extending outwardly therefrom, wherein the mounts on each component are spaced from one another so as to accommodate the mast therebetween. The mounts may each comprise an orifice extending therethrough. The mast may also comprise mounting orifices extending therethrough at different heights along the length of the mast. To attach the components to the mast, a user may align the orifice on the mounts with a mounting orifice on the mast and extend a pin or other device therethrough to secure the components in place on the mast.

Figure 4:
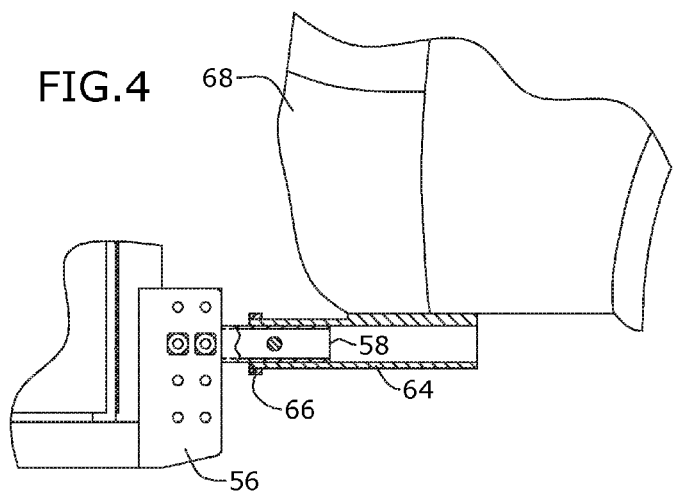
FIG. 4 is a detailed section view of one embodiment of the present disclosure.
Figure 4:
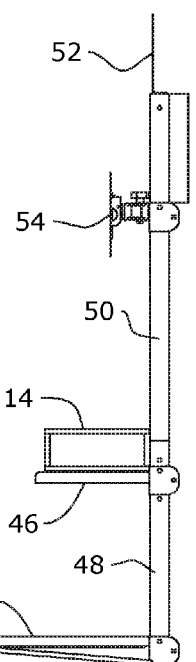
Figure 5:
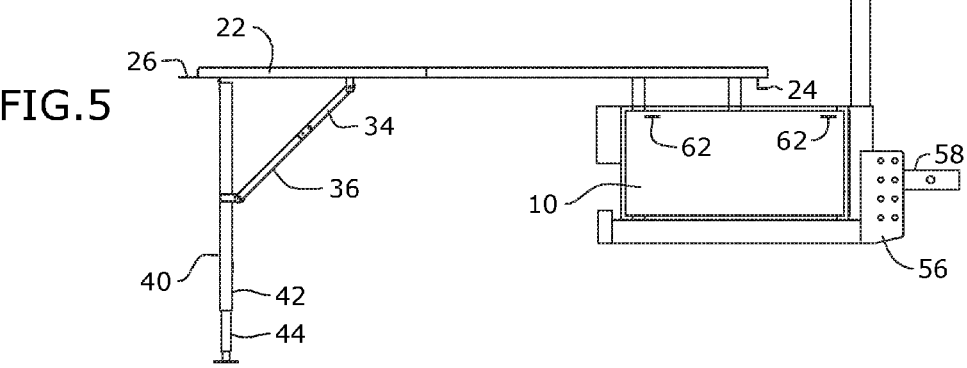
FIG. 5 is a side view of one embodiment of the present disclosure.
Figure 6:
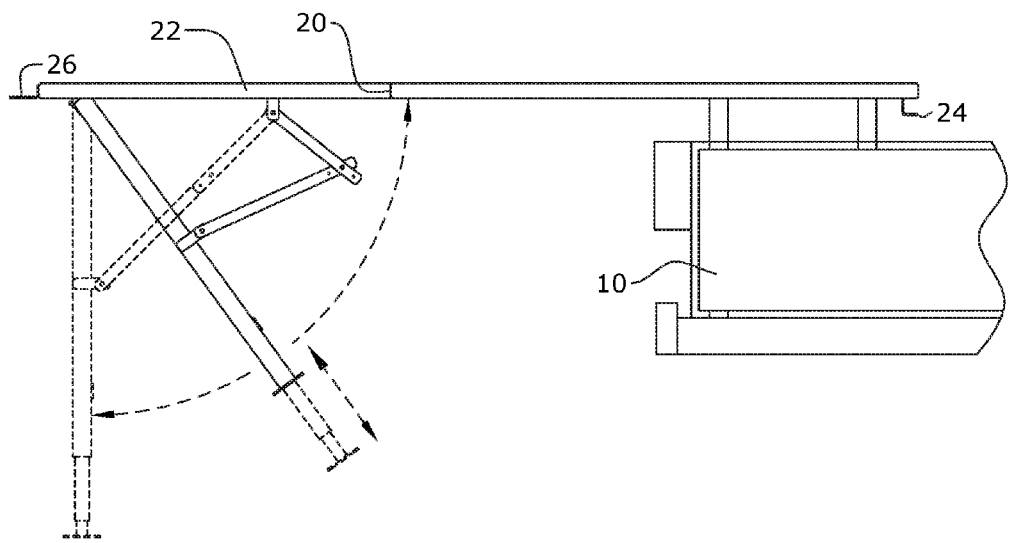
FIG. 6 is an enlarged side view of one embodiment of the present disclosure.
Figure 7:
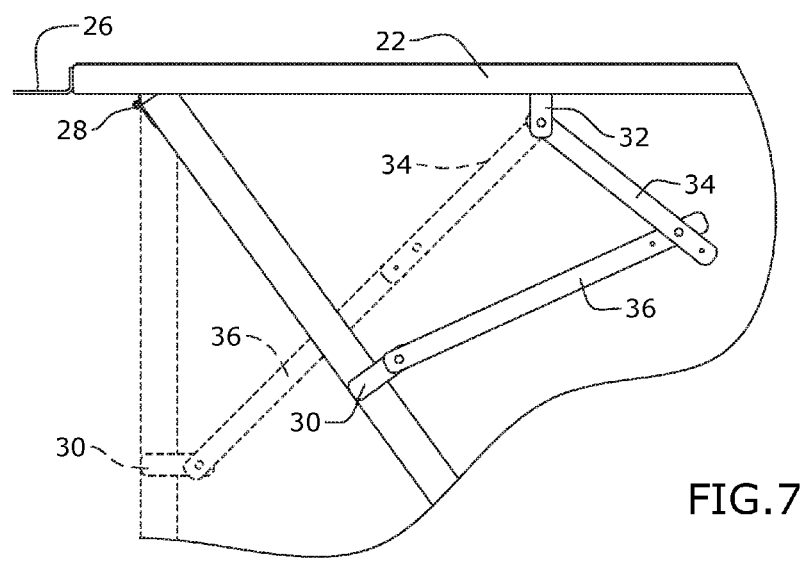
FIG. 7 is an enlarged side view of one embodiment of the present disclosure.
Figure 8:
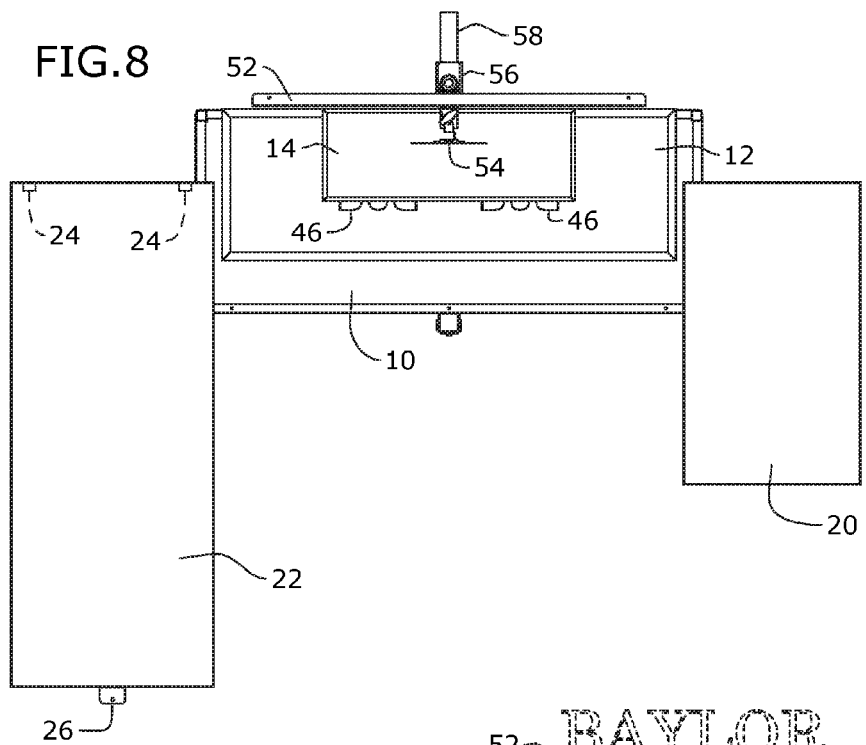
FIG. 8 is a top view of one embodiment of the present disclosure.
Figure 9:
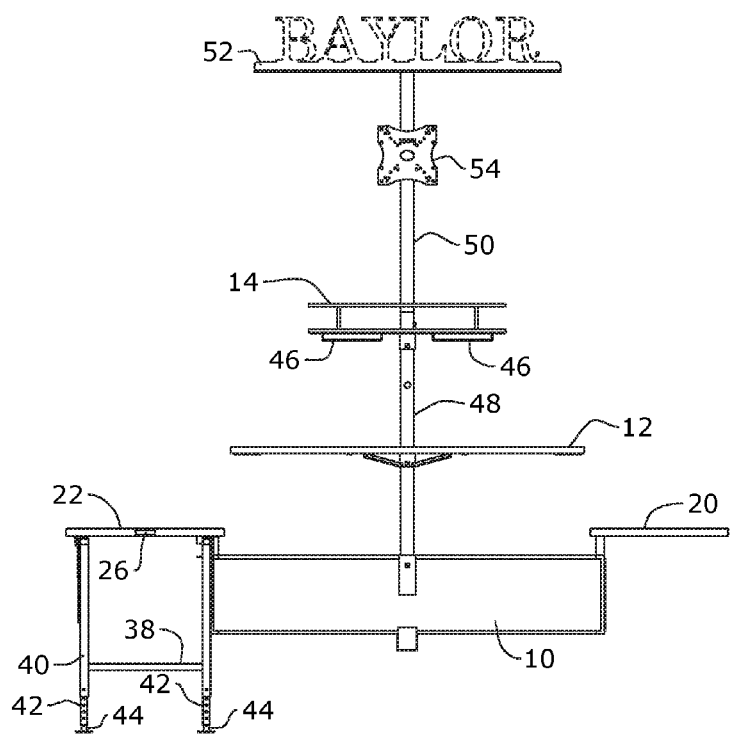
FIG. 9 is a front view of one embodiment of the present disclosure.

As shown in FIG. 4, the hitch 58 may extend through the hitch gasket 66 and into the receiving hitch 64 on a vehicle 68, such that the tailgating assembly may be removably attached to a vehicle. Any necessary electrical components may also run along the mast and to an outlet in the vehicle 68, as needed.

The tailgating assembly of the present disclosure may be used by removing each of the pieces from the cargo basket 10 and setting them up, as shown in the Figures or as otherwise desired. The cargo basket 10 may be sized to accommodate ice and a keg. The lid 22, when used as a table, may be set at a height that users may sit or stand at the lid 22, like a bar top. The side table 20 may be used as, for example, a barbecue table. In some embodiments, the outer surface of the components may include rubber bumpers (not shown) for safety.

The assembly of the present disclosure may be made of any suitable material and, in some embodiments, comprises steel, which may be optionally sand-blasted, powder coated, and/or painted. Additional optional attachments may also be attached to the assembly.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A tailgating assembly configured to attach to a receiving hitch on a vehicle, the tailgating assembly comprising:
    a cargo basket with a lid, the cargo basket having a cargo hitch attachment attached thereto;
    a hitch extending from the cargo hitch attachment, the hitch configured to engage with the receiving hitch;
    a mast removably attached to the cargo basket, the mast extending upward from the cargo basket at a position proximate to a center of a length of the cargo basket; and
    a table removably attached to the mast, the table extending outward from the mast, wherein the mast extends vertically above and below the table,
    wherein:
        the lid is configured to be positioned in two configurations, first as a cover to close the cargo basket and second as an additional table attached to an end of the cargo basket; and
        the tailgating assembly is configured to collapse down into the cargo basket.

2. The tailgating assembly of claim 1, further comprising a wine rack removably attached to the mast vertically above the table, the wine rack optionally including glass holders on a bottom surface thereof.

3. The tailgating assembly of claim 2, further comprising a TV mount attached to the mast vertically above the wine rack.

4. The tailgating assembly of claim 1, further comprising a sign assembly extending from a top surface of the mast.

5. The tailgating assembly of claim 1, further comprising a side table attached to the cargo basket.

6. The tailgating assembly of claim 1, wherein the lid has a foldable leg assembly attached to a bottom surface thereof.

7. The tailgating assembly of claim 1, wherein the mast comprises an upper mast assembly removably attached to a lower mast assembly.

8. The tailgating assembly of claim 1, wherein:
    an end of the cargo basket comprises a cargo latch;
    an end of the lid comprises a latch; and
    when the lid is placed on the cargo basket as a cover, the cargo latch and the latch are aligned.

9. The tailgating assembly of claim 8, wherein each of the cargo latch and the latch comprise an orifice configured to accommodate a lock such that the tailgating assembly can be locked within the cargo basket when not in use.

10. The tailgating assembly of claim 8, wherein:
    an end of the cargo basket opposite the cargo latch comprises at least one cargo catch slot; and
    an end of the lid opposite the latch comprises at least one lit catch, the at least one lid catch being configured to engage with the cargo catch slot to secure the lid as the cover on the cargo basket.

11. The tailgating assembly of claim 1, wherein when the lid is positioned as the additional table, the lid is attached to the end of the cargo basket via a pair of legs.

\* \* \* \* \*